US009463830B2

(12) United States Patent
Mehta et al.

(10) Patent No.: US 9,463,830 B2
(45) Date of Patent: Oct. 11, 2016

(54) VEHICLE FRAME JOINT ASSEMBLY AND METHOD OF FORMING THE SAME

(71) Applicant: FORD GLOBAL TECHNOLOGIES, LLC, Dearborn, MI (US)

(72) Inventors: Sanjay Mehta, Plymouth, MI (US); John Joseph Uicker, Dearborn, MI (US); Patrick Marchena, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 23 days.

(21) Appl. No.: 14/559,296

(22) Filed: Dec. 3, 2014

(65) Prior Publication Data

US 2016/0159409 A1    Jun. 9, 2016

(51) Int. Cl.
| | |
|---|---|
| *B62D 27/02* | (2006.01) |
| *B62D 65/02* | (2006.01) |
| *B62D 21/02* | (2006.01) |
| *B62D 21/11* | (2006.01) |

(52) U.S. Cl.
CPC .............. *B62D 27/026* (2013.01); *B62D 21/02* (2013.01); *B62D 21/11* (2013.01); *B62D 65/02* (2013.01)

(58) Field of Classification Search
CPC ..... B62D 27/026; B62D 21/02; B62D 65/02
See application file for complete search history.

(56) References Cited

U.S. PATENT DOCUMENTS

| | | |
|---|---|---|
| 6,540,216 B2 | 4/2003 | Tousi et al. |
| 7,571,917 B2 | 8/2009 | Ruehe et al. |
| 7,798,722 B2 | 9/2010 | Wulf et al. |
| 8,424,960 B2 | 4/2013 | Rawlinson et al. |
| 8,500,191 B1 | 8/2013 | Baccouche et al. |
| 2006/0083585 A1 | 4/2006 | Lew et al. |
| 2010/0032542 A1 | 2/2010 | Heitkamp et al. |
| 2012/0111661 A1* | 5/2012 | Panozzo ................. B60R 13/02 181/207 |
| 2012/0235401 A1* | 9/2012 | Richardson .......... B62D 27/023 285/285.1 |

* cited by examiner

*Primary Examiner* — Glenn Dayoan
*Assistant Examiner* — Melissa A Black
(74) *Attorney, Agent, or Firm* — Raymond Coppiellie; Law Firm of Dr. Junqi Hang, PLC

(57) ABSTRACT

In one or more embodiments, a vehicle frame joint assembly includes a first frame portion including an adaptor, a second frame portion defining a cavity to receive at least a portion of the adaptor, and a first adhesive layer positioned between the adaptor and the cavity when the first frame portion is connected to the second frame portion.

19 Claims, 3 Drawing Sheets

VEHICLE FRAME JOINT ASSEMBLY AND METHOD OF FORMING THE SAME

TECHNICAL FIELD

The present invention in one or more embodiments relates to a vehicle frame joint assembly and a method of forming the same.

BACKGROUND

Vehicles are designed to absorb impacts with energy-absorbing areas and/or partial deformation so as to provide occupants with relatively greater protection. Frame members are often connected with each other via frame joints, such that one or more of the frame members may be disengaged as needed and desirable during a collision event.

U.S. Pat. No. 8,500,191 discloses a breakable connector for a vehicle, including a clearance space defined in front of a frame joint such that the breakable connector may break into the clearance space when the sub-frame is subjected to a front end impact to reduce impact.

SUMMARY

According to one or more embodiments, a frame joint assembly includes a first frame portion including an adaptor, a second frame portion defining a cavity to receive at least a portion of the adaptor, and a first adhesive layer positioned between the adaptor and the cavity when the first frame portion is connected to the second frame portion.

The frame joint assembly may further include a second adhesive layer positioned between the first adhesive layer and the cavity. The first adhesive layer may differ in chemistry from the second adhesive layer.

The first adhesive layer may include at least two adhesive patches at least partially spaced apart from each other. The first adhesive layer may include a first adhesive patch and a second adhesive patch positioned along the circumferential direction of an outer surface of the adaptor. The first adhesive layer may include a first adhesive patch and a third adhesive patch positioned along the axial direction of the adaptor. The first adhesive layer may include an adhesive with melting temperature no less than 100° C.

The first frame portion or the second frame portion may be a sub-frame of a vehicle.

The adaptor may include a core and a shell. The core may differ from the shell in material. The adaptor may include an intermediate layer positioned between the core and the shell.

According to another one or more embodiments, a method of forming a frame joint assembly in a vehicle includes positioning an adaptor of a first frame portion to be at least partially received within a cavity of a second frame portion, and positioning a first adhesive layer to be between and contact the adaptor and the cavity.

The method may further include positioning a second adhesive layer to be between the first adhesive layer and the cavity.

The first adhesive layer may be applied to the adaptor and the second adhesive layer may be applied to the cavity. The first adhesive layer may be positioned to form first and second adhesive patches at least partially spaced apart from each other along a first direction. The first adhesive layer may be positioned to form third and fourth adhesive patches at least partially spaced apart from each other along a second direction different from the first direction. The first adhesive layer may be applied as a part of a pre-formed adhesive sandwich with removable backing sheets.

One or more advantageous features as described herein elsewhere will be readily apparent from the following detailed description of the one or more embodiments when taken in connection with the accompanying drawings.

BRIEF DESCRIPTION OF THE DRAWINGS

For a more complete understanding of one or more embodiments of this invention, reference should now be made to the one or more embodiments illustrated in greater detail in the accompanying drawings and described below by way of examples wherein.

DETAILED DESCRIPTION OF ONE OR MORE EMBODIMENTS

Figure 1:
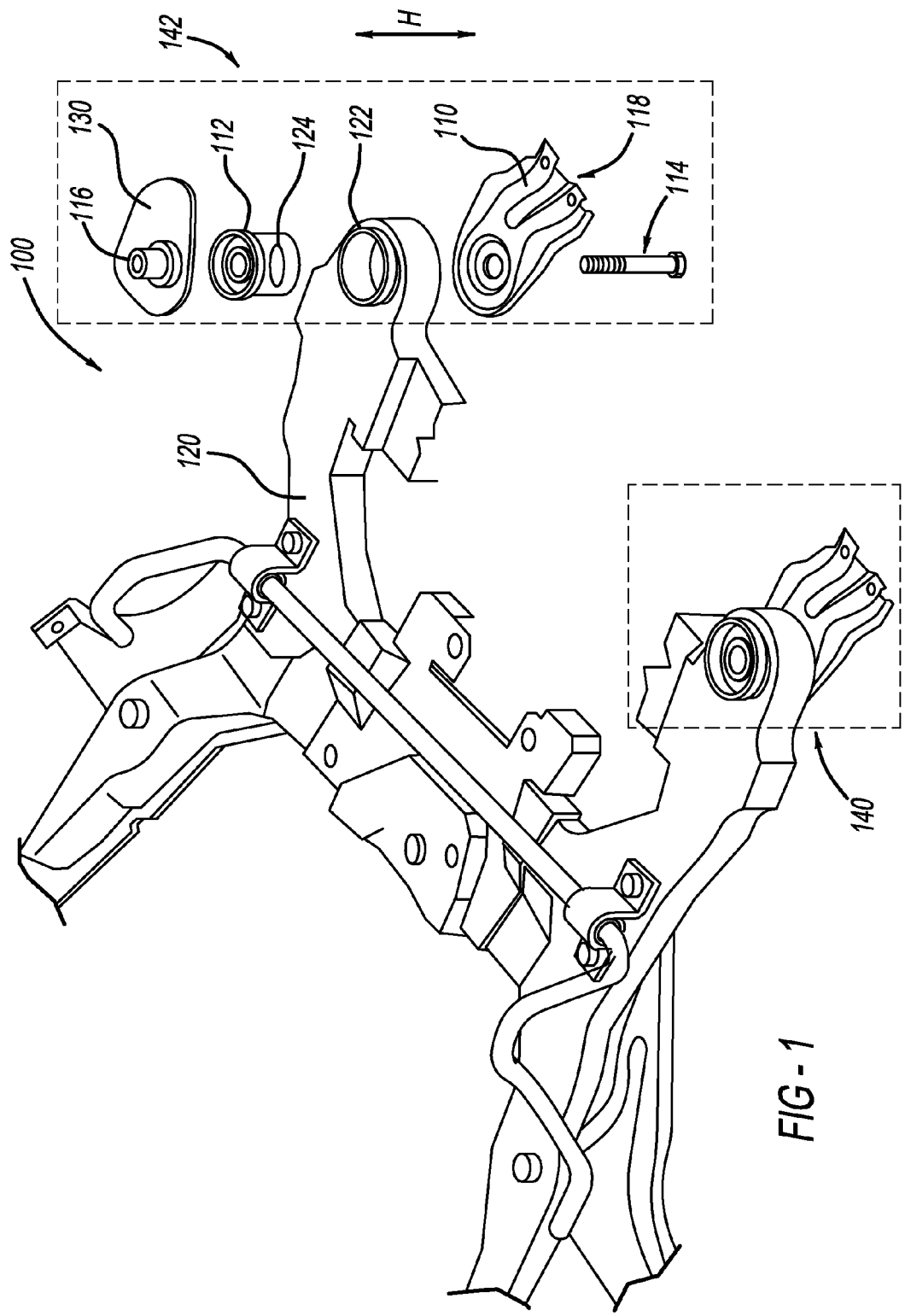
FIG. 1 illustratively depicts a perspective view of a frame joint assembly according to one or more embodiments.

As referenced in the Figures, the same reference numerals are used to refer to the same components. In the following description, various operating parameters and components are described for different constructed embodiments. These specific parameters and components are included as examples and are not meant to be limiting.

As will be detailed herein elsewhere, the present invention in one or more embodiments is advantageous in at least providing a frame joint assembly with relatively enhanced structural durability and/or reduced tendency to prematurely disengage upon impact. As detailed herein elsewhere, a premature disengagement between two joining elements along an axial direction may be advantageously reduced via the application of one of more adhesive layers and/or patches, wherein the applied amount, the chemistry type and the application location may be varied dependent upon the particular joint design at hand. The benefit of reduction in premature disengagement may be particularly advantageous in application where one or more plastic elements are involved in the formation of the joints to reduce overall weight, while plastic elements are relatively more prone to premature axial disengagement due to their reduced weight in part. Therefore, the present invention in one or more embodiments provides a synergistic solution for joints involving light weight elements while positioning the joint elements for relatively reduced premature disengagement.

FIG. 1 illustratively depicts a frame joint assembly 100 according to one or more embodiments. The frame joint assembly 100 includes a first frame portion generally shown at 110, a second frame portion generally shown at 120 connectable to each other at exemplary locations generally indicated at 140 and 142. Location 140 illustratively depicts a perspective view of a connection between the first and second frame portions 110, 120, and location 142 illustratively depicts a similar connection in an exploded view. The first frame portion 110 includes an adaptor 112, and the second frame portion 120 includes a cavity 122. The adaptor 112 may be received at least partially within the cavity 122 when the first frame portion 110 is connected to the second frame portion 120. An adhesive 124 optionally in the configuration of an adhesive layer is positioned between the adaptor 112 and the cavity 122 when the first frame portion 110 is connected to the second frame portion 120.

The shape or structure of the first and second frame portions 110, 120 are not limited to the shape or structure illustratively depicted in FIG. 1. In fact, the first and second frame portion 110, 120 may be selected from a group including a vehicle frame, sub-frame, vehicle body, floor, cab, pickup box, or any other parts of a vehicle. For purpose of illustration, the second frame portion 120 is shown as a sub-frame of a vehicle. It is to be appreciated that the first frame portion 110 may be in the configuration of a vehicle sub-frame. Further, the vehicle frame joint assembly 100 according to one or more embodiment may be implemented in other vehicle body parts where certain control in parts disengagement may be desirable. Moreover, additional structures (not shown) may extend from an end 118 of the first frame portion 110 to accommodate particular frame joint need at hand.

Referring back to FIG. 1, the second frame portion 120 includes the cavity 122, which may be connected to the second frame portion 120 via welding, adhesives, or any other suitable methods. In certain other embodiments, the cavity 122 may be formed integrally with the second frame portion 120; or in other words, the cavity 122 is part of and defined as a part of the second frame portion 120. For example, the cavity 122 may be an opening defined by the second frame portion 120.

Optionally, and referring back to FIG. 1, the adaptor 112 may be connected to the first frame portion 110 via any suitable mechanical methods such as a bolt 114 and a nut 116 optionally supported on a fixture 130. The adaptor 112 may also be connected to the first frame portion 110 via welding, adhesives, or any other suitable methods. The bolt 114 is largely rigid in material, and therefore is not likely to break upon a collision event such that the structural integrity of the connection between the first frame portion 110 and the second frame portion 120 may be reasonably expected. However, and particularly during an impactful collision event, the bolt 114 may bend and even ultimately break to the extent that the adaptor 112 may accordingly disengage from the cavity 122, and hence the separation of the first frame portion 110 from the second frame portion 120 so as to minimize the bodily impact to the occupants.

As mentioned herein elsewhere, in certain circumstances and particularly when parts of the adaptor 112 and the cavity 122 are formed of lightweight materials such as plastics, a premature disengagement of the adaptor 112 from the cavity 122 along an axial direction "H" and hence an unwanted separation of the first frame portion 110 from the second frame portion 120 may occur at least due to the lightweight construction of the involved parts. The premature disengagement may be reduced via the use of mechanical fasteners such as the nut 116 and the bolt 114. Such mechanical fasteners may however impose unnecessary amount of engagement force that may not be desirable in the event a suitable and prompt axial disengagement is indeed desirable.

The present invention in one or more embodiments is therefore advantageous in that the axial disengagement may be tailored to meet certain force and timing parameters via the use of an adhesive 124 positioned between the adaptor 112 and the cavity 122 for engagement. The adaptor 112 may be at least partially received within the cavity 122 when the first frame portion 110 is connected to the second frame portion 120. Advantageously, the adhesive 124 is positioned between the adaptor 112 and the cavity 122 so as to provide resistance to any premature axial disengagement therebetween. As detailed herein elsewhere, the adhesive 124 may be applied to an outer surface of the adaptor 112 and/or an interior outer surface of the cavity 122, such that the adhesive 124 is positioned between the adaptor 112 and the cavity 122 after the first frame portion 110 is assembled to the second frame portion 120. Although the adhesive 124 is illustratively depicted in FIG. 1 as a single layer or a patch, as detailed herein elsewhere, the adhesive 124 may be presented in any suitable configurations or arrangements as desirable.

Figure 2:
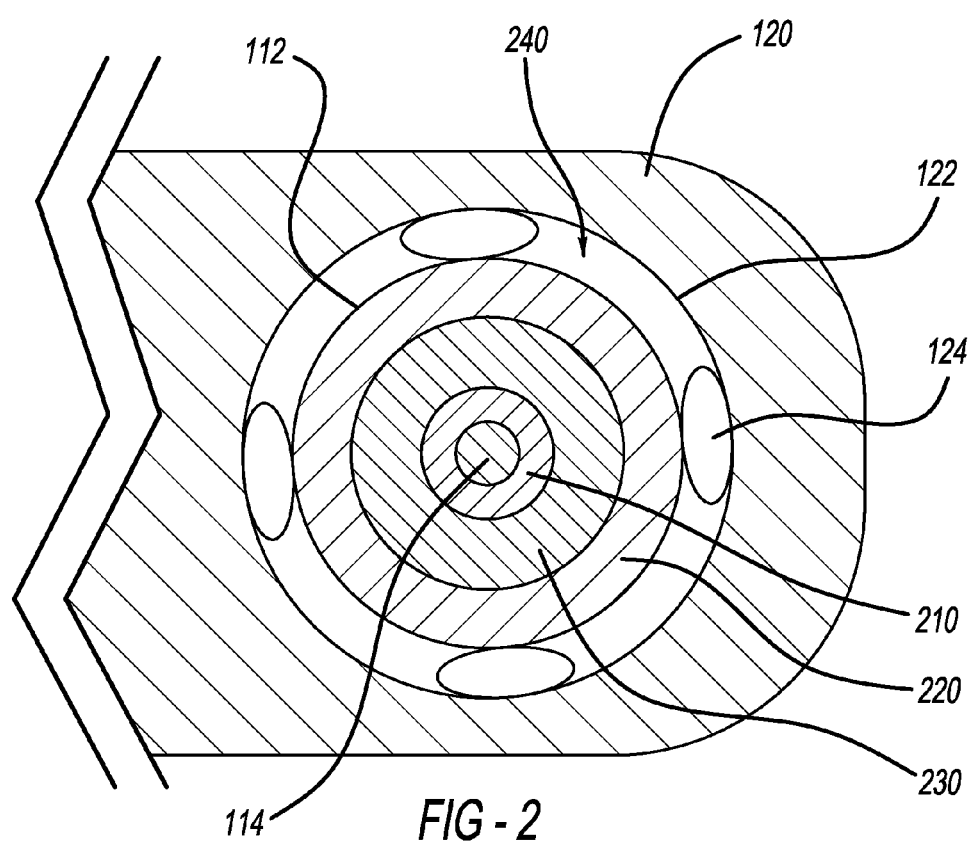
FIG. 2 illustratively depicts an enlarged cross-sectional view of the frame joint assembly referenced in FIG. 1.

Referring now to FIG. 2, which illustratively depicts a cross-sectional view of the vehicle frame joint assembly 100, wherein the first frame portion 110 is connected to the second frame portion 120 in one or more embodiments. The cavity 122 is formed on the second frame portion 120, and at least partially receives the adaptor 112. A gap 240 may remain between the adaptor 112 and the cavity 122 at locations where the adhesive 124 is not present. As can be seen, the gap 240 is particularly enlarged and likely not in proportion to demonstrate its presence relative to the adaptor 112 and the cavity 122. Under certain conditions such as during or after a prolong period of usage, the gap 240 may become more prominent, which may in turn result in relatively increased operational noise and potential premature separation between the adaptor 110 and the cavity 122 upon impact. Therefore in certain instances, the presence of the adhesive 124 may be increased or new application of the adhesive 124 may be desirable.

In one or more embodiments, the presence of the adhesive 124 is synergistically increased to reduce the coverage of the gap 240 not only to reduce any operational noise by essentially acting as a lubricant, but also to reduce the likelihood of any premature axial disengagement. As illustratively depicted, the adaptor 112 and the cavity 122 may closely match each other in shape and contour. For instance, and as illustratively depicted in FIG. 2, both the cavity 122 and the adaptor 112 take up a circular cross-section to match each other. It is to be appreciated that in other embodiments the cavity 122 and/or the adaptor 112 may be presented with any suitable shapes in cross-section, such as an oval, a rectangle, a polygon, or any other irregular shapes.

Optionally, and further in view of FIG. 2, the adaptor 112 may include a shell 220 and a core 210 at least partially received within the shell 220. The core 210 may be connected to the shell 220 via welding, adhesives, or any other suitable method. The cavity 122 and/or the adaptor 112 may be presented with any suitable shapes in cross-section such as an oval, a rectangle, a polygon or any other geometrical shapes. Further, the core 210 and the shell 220 may not necessarily be coaxial relative to each other. In certain embodiments, one or more intermediate layers 230 may further be provided to be positioned between the core 210 and the shell 220. Without wanting to be limited to any particular theory, it is believed that all involved layers of the adaptor 112, such as the core 210, the shell 220 and/or the one or more intermediate layers 230, may be bonded together and remain attached to each other for all desirable vehicle functions, such that these layers behave collectively as one whole unit relative to the cavity 122.

The core 210, the shell 220 and/or the one or more intermediate layers 230 may each independently be of any suitable materials and may differ from each other in material also. In one or more embodiments, the core 210 may include a metallic material, such as iron, steel, aluminum alloy, or any other suitable materials known in the field to ensure a robust connection with the first frame portion 110. Further, the shell 220 may include a plastic material to provide light-weight features, ease in production and certain anti-corrosion properties. The shell 220 may be adjusted for desirable thickness and/or contact area relative to cavity 122.

The adhesive 124 is illustratively shown in FIG. 2 as presenting four separate adhesive patches; however, the adhesive 124 may be presented with various arrangements as desirable or as needed. Additional views of the adhesive 124 of the vehicle frame joint assembly 100 are shown in FIG. 3 and FIG. 4.

Figures 3, 4:
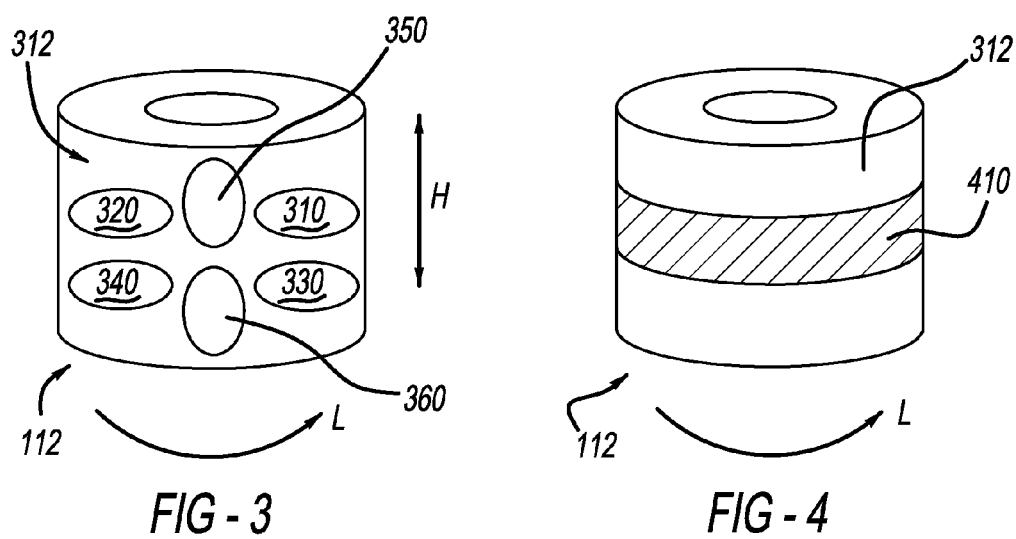
FIG. 3 illustratively depicts an enlarged perspective view of an adaptor of the frame joint assembly referenced in FIG. 1.
FIG. 4 illustratively depicts another enlarged perspective view of an adaptor of the frame joint assembly referenced in FIG. 1.

Now referring to FIG. 3, the adhesive 124 may include six adhesive patches 310, 320, 330, 340, 350 and 360 at least partially spaced apart from one another. The first and second adhesive patches 310 and 320 may be positioned along a first direction such as circumferential direction "L" along an outer surface of the adaptor 112. Further, the adhesive 124 may include more than two adhesive patches positioned along the "L" direction, and these adhesive patches may be positioned uniformly or non-uniformly along the "L" direction.

Similarly, as shown in FIG. 4, the adhesive 124 may include an adhesive patches 410 continuously extending along the "L" direction with regular or irregular width dimensions along the axial direction "H". Further, the adhesive 124 may be configured as covering more than 70 percent, 80 percent, or 90 percent in area of the outer surface of the adaptor 112. Accordingly a relatively uniform pullout force or anti-pullout force may be provided between the adaptor 110 and the cavity 120, providing the robustness and safe disengagement of the first and second frame portions 110, 120.

Referring back to FIG. 3, where the adhesive 124 is depicted to include the first and third adhesive patches 310, 330 and the second and fourth adhesive patches 320, 340. The first and third adhesive patches 310, 330 and the second and fourth adhesive patches 320, 340 may be positioned along the axial "H" direction, respectively. Further, the adhesive 124 may include more than two adhesive patches positioned along the "H" direction. Similarly, the adhesive 124 may include an adhesive patch (not shown) continuously extending along the "H" direction. Without wanting to be limited to any particular theory, it is believed that such configuration of the adhesive 124 effectuates a uniform pullout force or anti-pullout force that may be provided between the adaptor 110 and the cavity 120 to ensure robustness and safe disengagement of the first and second frame portion 110, 120.

Again, and as mentioned herein elsewhere, the adhesive 124 may be configured in any suitable shapes, applied in any suitable amounts so as to meet certain durability requirements and allow desirable disengagement during a collision, such that desirable disengagement between the first and second frame portions 110, 120 may be readily designed ahead of time based on vehicle types and driving needs.

To further simplify the implementation procedures and to provide relatively greater versatility, the adhesive 124 or various patches thereof may be pre-formed adhesive sandwiched within removable backing tapes otherwise known in the adhesives area. For instance, a pre-formed adhesive sandwich tape may be cut to shape and then applied to an exterior surface 312 of the adaptor 112 illustratively depicted in FIG. 3 and FIG. 4, and/or an interior outer surface 502 of the cavity 122 as illustratively depicted in FIG. 5. Accordingly, specific requirement in location, distribution and amount of the adhesive to be applied may also be relatively more precisely controlled as may be desirable.

In the event that the surfaces 312 and 502 are of different materials, adhesion to the adhesive 124 may be different due to the different materials. The present invention in one or more embodiments may further be advantageously carried out via the implementation of another or more adhesive layers placed next to the adhesive 124 optionally with different chemistry such that adhesion variation may be tailored to the particular need at hand. In other words, a first adhesive layer such as the adhesive 124 may be applied directly to the surface 312 and a second adhesive layer 524 may be applied directly to the surface 502 to accommodate for the material variations between the surface 312 and the adhesive 124, between the surface 502 and the adhesive 504, and between the adhesives 124 and 524 themselves.

Further, the adhesive 124 and/or the adhesive 524 may include various suitable types of adhesive materials. In certain embodiments, the adhesives 124 and/or 524 may include an adhesive material with melting temperature no less than 100° C. Without wanting to be limited to any particular theory, employing the use of the adhesive materials with the 100 degrees Celsius temperature capability is believed to help ensure that the adhesive material can endure temperatures possible in vehicle operation such that the adhesive material is not degraded at these temperatures and remains fully functional in the event of a crash. In other words, adhesive materials meeting such melting temperature conditions may withstand relatively better the heat and hence the high temperatures involved in the operation of the joints. Therefore, the performance of the frame joint assembly 100 is not likely to be effected greatly over a reasonable period of use. Non-limiting examples of the adhesive materials for the adhesive 124 and/or the adhesive 524 include epoxy and polyurethane.

Figure 5:
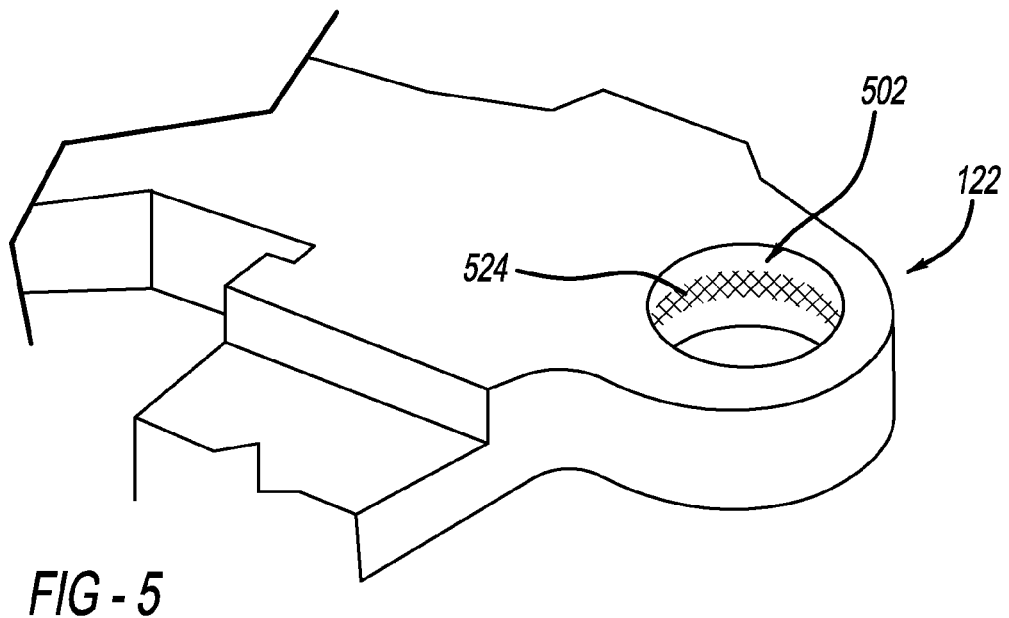
FIG. 5 illustratively depicts a perspective view of a cavity of the frame joint assembly referenced in FIG. 1.
Figure 6:
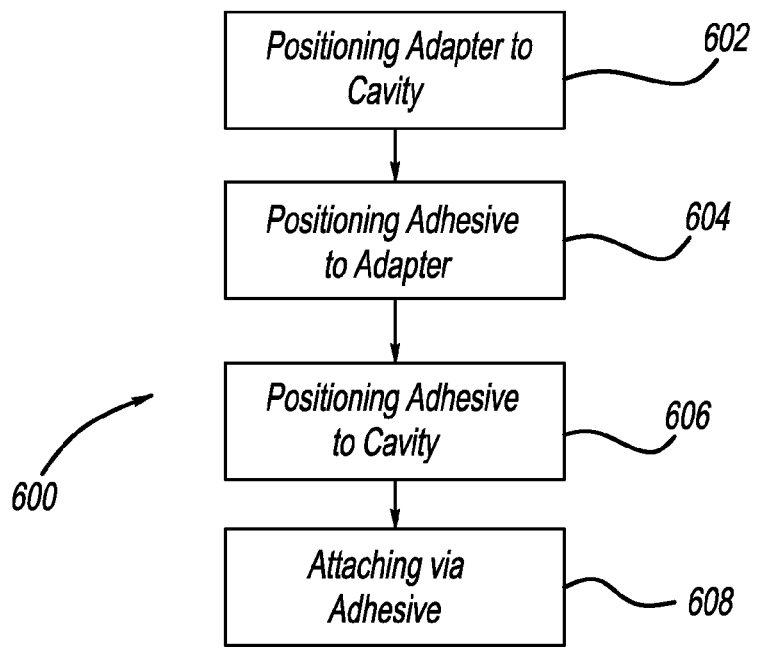
FIG. 6 illustratively depicts an exemplary flow chart of a method for forming the frame joint assembly referenced in FIG. 1.

In one or more embodiments, and as illustratively depicted in FIG. 6, a method generally shown at 600 may be used to form a frame joint assembly for a vehicle such as the frame joint assembly 100 described herein elsewhere. In view of FIG. 2 through FIG. 5, the method 600 may be carried out as follows. At step 602, the adaptor 112 of the first frame portion 110 is positioned to be at least partially received within the cavity 122 of the second frame portion 120.

At steps 604 and 606 collectively, the first adhesive layer 124 is positioned to be between and contact the adaptor 112 and the cavity 122. In particular, the first adhesive 124 is applied to the adaptor 112 at step 604 and the second adhesive 502 is applied to the cavity 122 at step 606. Although step 604 is depicted in FIG. 5 to be downstream of the step 602 and the step 606 is downstream of the step 604, the process flow does not always have to follow this order. As mentioned herein elsewhere, in the instances where preformed adhesive tapes may be used, the step 604 may be performed prior to or concurrently with the step 602.

At step 608, the adhesive as applied between the cavity 122 and the adaptor 112 collectively positions the first and second frame portions 110, 120 together for an attachment.

As stated herein elsewhere, the present invention in one or more embodiments provides a frame joint assembly. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A frame joint assembly of a vehicle, comprising:
   a first frame portion including an adaptor including a first plastic material;
   a second frame portion defining a cavity including a second plastic material and to receive at least a portion of the adaptor; and
   a first adhesive layer including at-least-partially-spaced-apart adhesive patches and positioned between the adaptor and the cavity when the first frame portion is connected to the second frame portion.

2. The frame joint assembly of claim 1, further comprising a second adhesive layer positioned between the first adhesive layer and the cavity, wherein the first adhesive layer differs in chemistry from the second adhesive layer.

3. The frame joint assembly of claim 1, wherein the first adhesive layer includes first and second adhesive patches positioned along a circumferential direction of an outer surface of the adaptor.

4. The frame joint assembly of claim 1, wherein the first adhesive layer includes first and third adhesive patches positioned along an axial direction of the adaptor.

5. The frame joint assembly of claim 1, wherein the first adhesive layer includes an adhesive material with melting temperature no less than 100 degrees Celsius.

6. The frame joint assembly of claim 1, wherein one of the first and second frame portions is a sub-frame of the vehicle, and the at least a portion of the adaptor is received axially within the cavity along a vehicle height direction.

7. The frame joint assembly of claim 1, wherein the adaptor includes a core and a shell positioned between the cavity and the core in an axial direction along which the cavity extends.

8. The frame joint assembly of claim 7, wherein the core differs from the shell in material.

9. The frame joint assembly of claim 7, wherein the adaptor includes one or more intermediate layers positioned between the core and the shell.

10. A method of forming a frame joint assembly in a vehicle, comprising:
    positioning an adaptor of a first frame portion to be at least partially received within a cavity of a second frame portion, the adaptor and cavity respectively including first and second plastic materials; and
    positioning a first adhesive layer to be between the adaptor and the cavity, the first adhesive layer including at-least-partially-spaced-apart adhesive patches.

11. The method of claim 10, further comprising positioning a second adhesive layer to be between the first adhesive layer and the cavity, wherein the first adhesive layer is applied to the adaptor and the second adhesive layer is applied to the cavity.

12. The method of claim 10, wherein the first adhesive layer is positioned to form first and second adhesive patches at least partially spaced apart from each other along a first direction.

13. The method of claim 10, wherein the first adhesive layer is applied as a part of a pre-formed adhesive sandwich with removable backing sheets.

14. A frame joint assembly of a vehicle, comprising:
    a first frame portion including an adaptor including a first plastic material;
    a second frame portion defining a cavity including a second plastic material and to receive at least a portion of the adaptor; and
    first and second adhesive layers positioned between the adaptor and the cavity, the second adhesive layer being positioned between the first adhesive layer and the cavity and differing in chemistry from the first adhesive layer.

15. The frame joint assembly of claim 14, wherein at least one of the first and second adhesive layers includes two or more adhesive patches at least partially spaced apart from each other in a first direction, and another two or more adhesive patches at least partially spaced apart from each other in a second direction different from the first direction.

16. The frame joint assembly of claim 1, wherein the first adhesive layer contacts both the adaptor and the cavity.

17. The method of claim 10, wherein the first adhesive layer is applied to contact both the adaptor and the cavity.

18. The frame joint assembly of claim 14, wherein the first adhesive layer contacts the adaptor and the second adhesive layer contacts the cavity.

19. The frame joint assembly of claim 1, wherein the first plastic material is at least partially present in an outer surface of the adaptor facing toward the cavity, and the second plastic material is at least partially present in an outer surface defining the cavity facing toward the adaptor.

* * * * *